(12) United States Patent
Wapner et al.

(10) Patent No.: US 6,756,112 B1
(45) Date of Patent: *Jun. 29, 2004

(54) CARBON MATRIX COMPOSITES FABRICATED BY A RAPID AND LOW-COST PROCESS INCORPORATING IN-SITU POLYMERIZATION OF WETTING MONOMERS

(75) Inventors: Phillip G. Wapner, Palmdale, CA (US); Wesley P. Hoffman, Palmdale, CA (US); Steven P. Jones, Oceanside, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/954,293

(22) Filed: Sep. 13, 2001

Related U.S. Application Data

(63) Continuation-in-part of application No. 09/100,774, filed on Jun. 8, 1998, now Pat. No. 6,309,703.

(51) Int. Cl.$^7$ .................................................. B05D 3/00
(52) U.S. Cl. ................. 428/293.4; 428/179; 427/288; 427/372.2; 427/384; 427/394
(58) Field of Search .............................. 427/288, 372.2, 427/384, 394; 428/293.4, 179

(56) References Cited

U.S. PATENT DOCUMENTS

| | | | |
|---|---|---|---|
| 4,513,030 A | | 4/1985 | Milewski |
| 5,437,821 A | * | 8/1995 | Diberardino et al. ...... 264/29.1 |
| 6,030,913 A | | 2/2000 | Heine et al. |

* cited by examiner

*Primary Examiner*—Elizabeth M. Cole
(74) *Attorney, Agent, or Firm*—Charles E. Bricker; Thomas L. Kundert

(57) ABSTRACT

A high-temperature fiber-reinforced carbon-carbon composite material of essentially uniform density, is fabricated by the following sequence of steps:

- (a) selecting a fiber/matrix material combination;
- (b) providing a fiber preform of desired shape and fiber placement;
- (c) selecting at least one low-viscosity pre-carbon monomer material that wets the surfaces of the fiber preform;
- (d) impregnating the fiber preform with the monomer;
- (e) polymerizing the monomer material in-situ in a single phase process into a pre-carbon polymer of desired molecular weight;
- (f) pryolyzing the pre-carbon polymer to form a carbon matrix material; and
- (g) repeating steps (d)–(f) to further densify the preform.

54 Claims, No Drawings

CARBON MATRIX COMPOSITES FABRICATED BY A RAPID AND LOW-COST PROCESS INCORPORATING IN-SITU POLYMERIZATION OF WETTING MONOMERS

This is a continuation-in-part of application Ser. No. 09/100,774, filed Jun. 8, 1998, now U.S. Pat. No. 6,309,703.

The invention described herein may be manufactured and used by or for the Government for governmental purposes without the payment of any royalty thereon.

BACKGROUND OF THE INVENTION

The present invention relates to high-performance, high-temperature fiber-reinforced structural composites with carbon matrices.

Fiber-reinforced composites consist of two distinct components, fibers and matrix. Fibers, either continuous or in the form of short segments, are normally oriented in preferred directions in composites to utilize as much as possible the fiber's great strength and stiffness properties. However, for low performance applications the fibers can be randomly placed to lower the cost of fabrication. Because fibers are heavily drawn and stretched during manufacture, they have properties superior to those of the same material in its undrawn and unstretched state; i.e., their bulk properties.

The matrix consists of material surrounding the fibers and has two purposes. The first is to fill the space between the fibers, which increases density and physically holds the reinforcing fibers in the preferred direction. The second is to transmit forces applied to the overall composite structure to individual fibers in such a manner as to distribute any applied forces, or loads, as nearly as possible to all fibers simultaneously. In this fashion, the high-performance fiber properties are retained by the composite since fibers bear more-or-less equal loads and hence do not break individually. This is accomplished with greatest success when all void spaces around fibers are filled in with matrix material. The void spaces are usually referred to as "porosity."

For elevated temperature applications, high-temperature fiber-reinforced composites (HTFRC's) are employed. These composites have excellent high-temperature strength retention, high strength-to-density ratio, and possess fracture toughness. In addition, the carbon-carbon (C—C) composites have high specific modulus, good thermal conductivity and thermal shock resistance. High-performance HTFRC's are used for structural applications in aerospace and rocket propulsion, such as, heat shields, leading edges and nozzles. To fabricate a high-performance HTFRC it is necessary to employ a high volume fraction (volume occupied by fibers/volume of composite) of the proper type and orientation of high performance reinforcement fibers that are held together in the composite by a high-density, high-quality matrix material.

Two categories of commercial processes have been developed to manufacture High-temperature Fiber-reinforced Composites (HTFRC) such as carbon matrix composites. These processes differ principally in the techniques used for the deposition of matrix materials around reinforcing fibers that have already been oriented and positioned into the locations they will occupy in finished products. One technique is vapor-phase in nature and is called "infiltration." The other is liquid-phase in nature, and is called "impregnation." Both of these existing techniques share a common initial step. That is the formation of a "rigid-preform". This process can involve the holding of the fibers in the desired orientation and position in a mechanical frame and coating them with a suitable binder material, but usually involves the more simple steps of coating reinforcing fibers with a binder, which may be the same material as used to form the matrix, and then forming them into the desired shape by filament winding, hand lay-up, weaving, braiding, or some other means. This coated fiber preform is then heated to high-temperatures, with appropriate means taken to prevent loss of preform shape. The result of the heat treatment is the conversion of the binder to an inorganic cement. At this point any mechanical means of holding the fibers may be removed. The purpose of this cement, which can be produced from either a vapor or liquid hydrocarbon precursor, is to hold the reinforcing fibers in the shape desired for the final product. The ensemble of cemented fibers is called the rigidzed-preform, which is then subjected to subsequent processing. The task of heating the binder, or other materials used in HTFRC fabrication, to high temperatures to effect a change in chemical composition is usually referred to as "pyrolysis." In most cases, this modification of the binder is from an organic to an inorganic substance. The cement formed by pyrolysis of the binder is very porous because of the relationship between pyrolysis efficiency and binder physical-property requirements. As mentioned previously, great care must be taken when handling high-performance fibers or the resulting damage will greatly diminish composite properties. This means that forces encountered by the reinforcing fibers during coating and positioning must be minimal. This can only occur if binder viscosity is low and care is taken in handling. Unfortunately, pyrolysis efficiency (the weight percent of binder remaining after pyrolysis) is usually found experimentally to increase only when binder viscosity is high. One solution to this dichotomy is the following current manufacturing methodology: keep rigid-preform performance potential high by utilizing low viscosity binders, and adjust for the resulting high initial porosity with subsequent processing. This subsequent processing to deposit material between the fibers in the preform is usually referred to as "densification," and is usually repeated many times.

As mentioned above, densification using existing technology takes one of two forms. The first is vapor-phase-based and involves placing the rigid-preform in an oven containing gases which decompose at high temperatures inside the preform to form carbon matrices. This process is referred to as chemical-vapor infiltration (CVI). The decomposition reaction is usually referred to as "cracking", since the splitting-apart of gas molecules is involved. However, it is also sometimes called pyrolysis, the same term used previously to describe similar thermal decomposition reactions occurring in solids and liquids. CVI has a number of problems associated with its use, the two most critical being pore closure at the surface leading to non-uniform densification, and poor matrix quality due to existence of multiple decomposition reaction-pathways leading simultaneously to multiple phases. Pore closure is detrimental because it denies access of infiltration gases to the preform interior. It occurs because cracking occurs more easily at solid surfaces. Thus, as gases attempt to enter rigid-preforms, decomposition takes place almost immediately on or near the hot exterior surfaces. This results in a density gradient through the sample, with a higher density matrix near the surface. This density gradient also limits the thickness of a high-performance part to less than 2". The preferential deposition on or near the surface ultimately leads to the sealing off of the surface pore entrances in a relatively short period of time. Multiple phases are also harmful in most instances because they do not join together or consolidate well, making the matrix weak. These problems are both minimized to some extent by slowing down the CVI process. Also, partially-densified composites can be periodically removed from the CVI oven and have their surfaces machined away enough to reopen sealed pore entrances. This is, of course, very time consuming and adds expense. For carbon matrix composites, prior to or subsequent to machining, the partially-densified preform is heated to about 2400° C. for long periods of time to convert the carbon matrix to a graphitic matrix. This process takes days to weeks and has associated high energy costs. The result of the steps described is processing times of many months, severe quality control problems, and associated high costs in both labor and energy.

The second densification process using existing commercial technology is liquid-phase-based. It involves impregnating rigid-preforms with liquid matrix-precursors and subsequently heating to high temperatures to initiate pyrolysis. It is in many ways similar to formation of rigid preform themselves, and suffers from the same drawbacks. Ease of impregnation and gentleness of handling are aided by lowered viscosity, but pyrolysis efficiency and matrix quality are enhanced by elevated viscosity. This is because the high viscosity matrix precursors produce a low porosity (high density) matrix which maximizes the physical integrity of the matrix thereby utilizing more and more of the reinforcing-fiber's performance potential. Ideally, for maximum mechanical properties there should be zero matrix porosity.

However, because high viscosity liquid matrix-precursors do not easily enter and flow through pores in rigid-preforms, manufacturers of C—C composites have enhanced entry and flow by immersing rigid-preforms in liquid matrix-precursor, heating the precursor to lower the viscosity, and applying pressure. This is necessary because these traditional liquid matrix precursors do not wet the perform as described below. This processing methodology does in fact help impregnation. However, it requires that heated pressure vessels be employed, which are very costly, and causes fiber breakage if pressures are changed too rapidly.

As with rigid-preform formation, the goal of attaining composite performance as high as possible presents a dilemma: use low-viscosity liquid matrix-precursors and obtain good impregnation, but poor pyrolysis efficiencies; or use high-viscosity liquid matrix precursors and obtain poor impregnation but high pyrolysis efficiencies. In either case, multiple liquid-densification steps will be needed because conversion of the matrix precursor normally results in a reduction of the matrix volume.

Because of the polymeric nature of these liquid matrix precursors, low viscosity can be achieved in the unadulterated state (i.e.; no solvents present) only by having the molecular weight low. This, in turn, reduces pyrolysis efficiency and affects matrix quality negatively, as explained earlier. Adding solvents to high-molecular-weight liquid matrix-precursors can certainly aid impregnation and result in improved matrix quality. But this approach actually increases the number of impregnation-plus-pyrolysis steps needed due to the high dilution ratios required to get acceptably low viscosities. Solvent rather than actual liquid matrix-precursor fills up most of the void space within preforms, and it must be removed prior to pyrolysis. This is a very time-consuming process. If solvent is not completely removed, any residual amount will turn into gas at temperatures far below those needed for pyrolysis. This results in either destruction of the preform (it literally explodes) or the expelling of high molecular-weight liquid matrix-precursor impregnated with the solvent.

In summary, manufacturers of carbon-carbon composites using a liquid phase precursor have therefore been faced with two choices. They can employ a low-viscosity liquid matrix-precursor and obtain good impregnation under pressure, filling most larger pores completely, but resulting in a small amount of low-quality matrix due to low molecular weight and poor pyrolysis efficiency. Alternatively they can utilize a high-viscosity liquid matrix-precursor forced in with higher pressure, which results in a small amount of better-quality matrix due to its higher molecular weight and good pyrolysis efficiency. However, on the down side, this high viscosity precursor does a poorer job of filling the porosity and will degrade composite properties resulting from the increased fiber breakage.

In addition, like CVI processes, current liquid phase processes seal off the surface pores and preferentially close off small pores, producing a billet with non-uniform density. In addition, these processes also require machining to open up the surface pore structure and graphitization to enhance the properties of carbon matrixes and open up internal pore structure. The result is again processing times of many months for high-matrix-density high-performance composites. It is the deficiencies of the long processing times, high costs, and non-uniform matrix density of such liquid-phase based processing which this invention addresses.

It should be noted that liquid binders used in rigid-preform formation and liquid matrix-precursors employed in densification can be, but usually are not, the same chemical substance. In C—C composites, for example, the former is almost always phenolic in a solvent, while the latter is typically a refined petroleum or coal-tar pitch such as A240 or 15V. The fundamental chemical characteristic common to both liquid binders and liquid matrix-precursors used in all carbon matrix composites is that they are polymers. This fact explains why low-viscosity binders and precursors have low pyrolysis efficiencies and produce poor-quality matrices. In order to have low viscosity, polymers must possess a limited number of repeat units, otherwise entanglements between polymer chains occur during fluid flow limiting mass transport. During matrix formation by pyrolysis, the desired reaction is the loss of certain light constituents atoms, such as hydrogen, from polymer repeat units with no cleavage taking place between repeat units at all. However, in practice there is always unwanted but unavoidable side reactions in which there is the complete cleavage of individual repeat units off the ends of the polymer molecules thereby forming higher-molecular-weight gases. Since chain ends break off in cyclic fashion (i.e., one after another in rapid succession), pyrolysis yields are much lower in low-molecular-weight polymers than in high-molecular-weight polymers. High-molecular-weight polymers simply have far fewer chain ends to begin with, so there is much less end-breakage and associate gas evolution during pyrolysis. Gas evolution is detrimental because it pushes liquid matrix-precursor out of rigid-preforms before matrix formation by pyrolysis takes place and reduces the pyrolysis yield.

Moreover, high-molecular-weight polymers are better at aligning segments of their chain together than are low-molecular-weight polymers. The latter simply have too much mobility to stay aligned together for very long periods of time, especially at the high temperatures needed for pyrolysis to take place. They therefore tend to form poorly oriented or amorphous matrices. These typically have lower density and inferior physical properties. As stated before, the ideal liquid binder or liquid-matrix precursor should have high viscosity, at least from the viewpoint of pyrolysis efficiency and matrix quality. In light of the preceding observation, this would be due primarily to their having high molecular weights.

Two additional considerations, which are pertinent to understanding the negative aspects of existing liquid-densification techniques discussed above, are pressure impregnation, and wettability. Knowing that high viscosity liquid matrix-precursors do not easily enter and flow through pores in rigid-preforms, manufacturers of HTFRC's have enhanced entry and flow by immersing rigid-preforms in a liquid matrix precursor and applying pressure. This does in fact help impregnation. However, it requires that heated pressure vessels be employed, which are very costly, and cause fiber breakage if pressures are changed too rapidly.

In contrast to industry thinking for the past 30 years, viscosity is not the dominant issue in impregnation. Rather, it is the lack of wettability that is principally responsible for the fact that pressure is needed to force precursors into the perform independent of their viscosity over certain ranges. That is, if a liquid wets a surface, it will tend to spread out on the surface and will automatically fill pores in the material. In contrast, if a liquid does not wet a surface, liquid droplets will sit on the surface and liquid will not spontaneously enter pores in the material. The pressure, P, needed to force a non-wetting fluid into a pore or capillary of radius, r, is given by the equation:

$$P = 2\gamma \cos \theta / r$$

where $\gamma$ is the surface tension of the fluid and $\theta$ is the contact angle that the fluid makes with the surface. It can be seen from this equation that as the radius of the pore or void in the material decreases more pressure is required to force the non-wetting fluid into that pore. Thus, larger pores are filled first at lower pressure.

If pressure is employed, care must be taken not to break the fibers; consequently, pressure must be applied slowly. This will force the precursor into the larger pores in the perform preferentially and, depending upon the thermal treatment of the precursor while forcing the material in, smaller pores can be blocked and remain unfilled. In addition, as the precursor is converted to carbon, shrinkage occurs creating additional void space. In many cases, this void additional space is too small to be filled by the applied pressure and it therefore remains unfillable becoming closed porosity.

It is known from work in our laboratory that during fabrication of C—C composites, for example, high-molecular-weight liquid matrix precursors do not wet fiber surfaces, whereas some low-viscosity low-molecular-weight liquid matrix-precursors at least partially wet fiber surfaces. In general, our work has shown that, for a particular series of pitches, the lower the molecular weight, the better liquid matrix precursors wet fiber surfaces, as measured by contact angle. However, it should be stated that low molecular weight and low viscosity do not guarantee wetting of the matrix material on a particular surface. Whenever liquid matrix-precursors possess good wetting properties impregnation is greatly aided because the precursors readily soak into rigid-preforms in much the same fashion as water soaks into cotton fabric.

In contrast, if the matrix precursor does not wet the fibers as in current processing technology, pressure will be needed to force the matrix precursor into the preform. This will produce an uneven distribution of matrix precursor in the preform. The result being a higher density near the surface than the center of the preform as well as the closure of surface pores. To try to compensate for these two shortcomings, i.e., inability to density the billet uniformly and the associated surface pore closures, manufacturers of carbon matrix composites, for example, machine the outside of the billet to open up the pore structure and then re-impregnate, carbonize, graphitize and machine up to eighteen times. This is an extremely time consuming, labor intensive and costly process that can take up to eighteen months for a large billet.

The commercial manufacture of carbon-carbon composites has taken place for more than 30 years and is a rather mature field. Both chemical vapor infiltration (CVI) and liquid phase impregnation techniques (or a combination of the two) have been used to place the carbon matrix in the rigidized preform.

During this time the goal has remained the same: to be able to produce a thick (>2") billet with uniform density at low cost. This objective not been obtained to date commercially due principally to the matrix precursor employed. Conventional gas phase chemical vapor infiltration processes using hydrocarbon precursors are not able to uniformly densify a large-thick billet of complex shape because of the preferential deposition on the outer portion of the billet and the inability to control concentration and temperature gradients in the gas phase. In addition, this family of processes is very expensive due to the expensive equipment and the long processing times required. Attempts to solve the surface deposition problem have involved using a pressure gradient alone or in conjunction with a temperature gradient (hotter on side opposite gas entry) through the part to be densified In addition, a temperature gradient through the part utilizing a heater in the center in conjunction with surface cooling involving a liquids latent heat of vaporization has been employed. All three approaches have met with some success. However, these techniques are still very costly and limited to relatively small and thin parts with little shape complexity. However, it should be mentioned that the combination of forced flow and a reversed temperature gradient has increased the thickness that can be densified with reasonable uniformity to nearly two inches. Liquid-phase matrix precursors have included neat organic resins, particulate loaded resins, as well as all types of petroleum and coal tar pitch materials. The patent literature contains many processes that utilize various organic resins, coal tar pitches, petroleum pitch solvent-refined pitches, particulate loaded resins, and super-critically-refined pitches.

The ability to produce low cost composites with uniform density using liquid-phase carbon precursors has been hindered by the conflicting demands of high char yield and low viscosity. Processes using various organic resins as well as coal tar and petroleum pitch suffer from the fact that these materials have low char yield and high viscosity unless solvated. In addition, these materials do not meet the critical criteria of wetting the fiber preform surface. Processes that involve the use of solvent-refined pitches, super-critically-refined pitches, and mesophase liquid-crystal polymer have increased the char yield but have not addressed the wettability issue. Thus, they still require many costly processing cycles to produce a composite that is not uniform in density. The use of carbon particulate loaded resins again increases the char yield. However, these processes suffer from the same problems as non-loaded resins and in addition are not able to density a thick composite. In fact, they actually produce a lower quality composite because the particles block the pore structure on the first cycle and limit subsequent densification.

Currently, the matrix precursor material of choice is a mesophase liquid crystal polymer made from petroleum pitch using various proprietary temperature-pressure cycles. The use of mesophase pitch brings up one last factor which is pertinent to the understanding of the shortcomings of some existing liquid densification techniques for carbon matrix composites. This is the polymerization pathway used to form the matrix precursor. Since the high-char-yield mesophase pitch, for example, is too viscous to use for impregnation and does not wet the preform surface, the preform is impregnated with low-viscosity, low-char-yield isotropic pitch, which is able to wet the preform surface. This pitch is then converted to mesophase pitch inside the preform using various temperature-pressure cycles. The problem with this technique is that it involves a two-phase addition polymerization process since the mesophase is not miscible in the isotropic pitch from which it is made. Thus, when the size of the liquid crystal mesophase spheres formed in the isotropic pitch within the preform exceeds the size of the space they occupy, they are expelled and replaced with the isotropic pitch material which forms a lower quality matrix.

In contrast to current densitication processes, using isotropic petroleum pitch, with the present invention there is only a single phase present within the perform because mesophase is produced directly from the monomer without any phase change. That is, after the low-molecular-weight wetting monomer coats the preform and fills the voids, it is polymerized into a miscible high-molecular-weight polymer. Although, this high-molecular-weight condensation polymer does not wet the surface, it is not expelled if there is a single phase because it is highly viscous.

The historical evolution of carbon matrix precursors from as-received pitch materials to mesophase pitch, has developed to try to improve the quality of the matrix microstructure and to attempt to solve the problem of uniform through-the-thickness density in the finished billet. Over the years the matrix microstructure has been improved but no process to date has been able to uniformly densify a thick preform. This is because the universal criteria for efficient impregnation of the preform has been viscosity. No one has used the more important criteria of wettability in selecting the best matrix precursor. Thus, all the processes in the patent literature rely on temperature to lower the viscosity, and pressure or a combination of vacuum and pressure to force the non-wetting matrix precursor to into the rigidized preform. This is a very inefficient process that preferentially fills larger pores, seals off smaller pores, and densities the exterior of the preform at the expense of the interior. As a result of using a non-wetting matrix precursor or matrix material, many impregnation-carbonization-graphitization-machining-cycles are required to reach a density of 1.9 g/cc. This equals many months of processing at a cost that keeps the market for carbon-carbon small. To add insult to injury, even though the final product is very costly, it does not have uniform density through the billet. It is clear that there is a great need for a low-cost impregnation technology that produces a billet with uniform density and good mechanical properties.

Currently, cost is the main factor that limits the application of carbon-carbon in many areas. Approaches to lower cost have included using low cost fiber, low cost matrix material, adding particulate fillers to the matrix, using random orientation of fibers, as well as molding and hot-pressing techniques. However, in an attempt to lower cost, performance has been degraded to such an extent that it precludes the use of carbon-carbon composites made by these processes in many high-performance structural applications. What is needed is a means to significantly lower the cost of carbon-carbon composites while maintaining or enhancing the composite properties and performance. Since the main cost of carbon-carbon composite fabrication is associated with the densification process, there is a need for a low cost liquid phase densification technique.

Although this invention only addresses liquid phase impregnation, it should be stated that all gas phase infiltration techniques known to date suffer from the same drawbacks as just stated for liquid phase infiltration. That is, they are very time consuming, very costly and are not capable of producing a thick billet with uniform density through the thickness. In fact, CVI processes are even more inefficient than liquid phase processes in densifying the center of a billet. As a result, CVI processing is not normally used to attempt to densify thick preforms. Therefore, there is a more general need. That is, for a densification process that will produce carbon composites at low cost and with uniform density and excellent mechanical properties.

We have found that carbon-carbon composites can be fabricated in a manner that is not only economical, but overcomes most, if not all, the drawbacks of the techniques discussed hereinbefore. We have found that high-performance HTFRC's can be fabricated by impregnating composite preforms with liquids, i.e., monomers, which wet the fibers and subsequently undergo polymerization and carbonization reactions in the perform to create carbon matrices. These preforms include, but are not limited to: externally mechanically constrained performs; performs rigidized with a binder; and performs internally constrained by weaving, braiding, flocking, or entanglement.

The use of a monomer that wets the preform and the partially-densified preform surface is a distinctive point of this invention. Although lower viscosity increases the rate of impregnation into the perform, it is not the key factor that it is in other processes. In the densification process of this invention viscosity does not determine whether or not the impregnant will go into the perform but only the rate at which it enters. Thus, the required viscosity of the wetting monomer is based on economic and schedule constraints rather than technical requirements. Once the monomer has been drawn inside the preform, another feature of this invention is the initiation of polymerization of the monomer molecules, which we refer to as "In Situ Densification". After polymerization takes place, the resulting liquid matrix-precursor will acquire the high molecular weight needed to produce a superior matrix (upon pyrolysis) with high efficiency. The molecular weight of the polymer can also be controlled in this invention in order to tailor composite properties. Thus, this invention combines the low viscosity of the monomer and the high char yield of the polymer along with the wettability of the monomer to produce a high quality uniform matrix without the need for costly pressure vessels and long processing times with associated high costs.

In the wetting or nonwetting of solids by liquids, the criterion employed is the contact angle between the solid and the liquid, as measured through the liquid. A liquid is said to wet a solid if the contact angle is between 0 and 90°, and not to wet the solid if the contact angle lies between 90° and 180°. A mundane example of the wetting/nonwetting phenomenon may be seen on a dirty/clean automobile during a rain shower: on a clean automobile the rain droplets bead on the surface, an example of nonwetting, while on a dirty automobile the rain droplets spread out, an example of wetting.

Accordingly, it is an object of the present invention to provide a high-temperature fiber-reinforced composite with essentially uniform density and an insignificant amount of closed porosity.

Another object of the present invention is to provide a carbon-carbon composite with high density, high strength, high modulus and high thermal conductivity without graphitization.

Yet another object of the present invention to provide a process for making a high-temperature fiber-reinforced composite with essentially uniform density and an insignificant amount of closed porosity.

A further object of the present invention is to provide a process for making a carbon-carbon composite with high density, high strength, high modulus and high thermal conductivity without graphitization.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a process for manufacturing a high-temperature fiber-reinforced carbon composite material of essentially uniform density, which comprises the steps of:

(a) selecting a fiber/matrix material combination;

(b) providing a fiber preform of desired shape and fiber placement;

(c) selecting at least one low-viscosity pre-carbon monomer material that wets the surfaces of the fiber preform;

(d) impregnating the fiber preform with the monomer;

(e) polymerizing the monomer material in-situ in a single phase process into a pre-carbon polymer of desired molecular weight;

(f) pyrolyzing the pre-carbon polymer to form a carbon matrix material; and (g) repeating steps (d)–(f) to further densify the preform.

The resulting composites consist of a high volume fraction of high-performance carbon reinforcement fibers that can have any number of dimensions (1-D, 2-D, 3-D, ... n-D) of orientation that it is possible to construct by felting, weaving, braiding, lay-up, etc. In general, what constitutes a high-fiber-volume-fraction depends on the number dimensions of fiber reinforcement, but an average value for a high performance composite is 45%. These composite materials are unique in that they have a uniform density through the composite and the smallest voids are completely filled preferentially by capillary action and remain filled during processing. This means that in one densification cycle the voids within the fiber bundles or tows are completely filled with matrix tightly bonded to the fibers allowing highly efficient transfer of load between the fibers. The result of this complete fiber bundle filling is that after one densification cycle, even though the matrix pockets have not been completely filled, these composites can have the properties of multi-cycle heat-treated (graphitized) composites of similar density. Thus, it is not required (although this is optional) to go through the costly and time-consuming graphitization process in order to achieve desired properties.

As used herein, the term "high-density" means at least 80% of theoretical density.

It is also within the scope of this invention to use more than one monomer to densify the preform. These monomers can be introduced into the preform together during the same cycle in order to ultimately form a hybrid matrix material or they can be introduced during different cycles to form a layered structure for additional fracture toughness. With this technique one can also tailor the molecular weight and make it whatever desired. The minimum molecular weight is that required to form mesophase liquid crystals which are three dimensional molecules composed of non-linear planar molecules that are not cross-linked.

DESCRIPTION OF THE PREFERRED EMBODIMENT

The first step in the process is to select the fiber-matrix combination to be used in the manufacture of the composite. The choice of the fiber(s) is made on the basis of the desired mechanical properties and other criteria such as its behavior in the use environment. A variety of reinforcing fibers suitable for use in the present invention are available and known to those skilled in the art.

The monomer(s) of the matrix precursor material is then chosen on the basis of the desired matrix material, the char yield of the matrix precursor, as well as on its ability to wet the fiber surface as well as the surface of the carbon matrix material that is made from the pyrolysis of the matrix precursor formed by the polymerization of the monomer. The minimum wetting criteria for the matrix monomer is that it forms a contact angle of less than 90° with the surface of the fiber or partially-densified preform so that it wets the surface. It is better that the monomer of the matrix precursor forms a contact angle of less than 10° degrees. However, the preferred situation is that the contact angle is zero degrees with the fiber or partially-densified preform surface so that it easily spreads over the surface. If the fiber surface of choice is not wet by a particular monomer, it may be possible to increase wettability. This can be accomplished by removing the fiber surface sizing as well as by performing a surface treatment to increase surface defects or add chemical functional groups in order to increase the surface energy of an uncoated fiber surface. These treatments include chemical processes such as oxidation, physical processes such as bombardment, or plasma processes. Another option is to apply a coating of another fiber surface to increase wettability. These coatings can include a rigidization cement or an oxidation protection coating on carbon fibers. Alternatively, the monomer itself can be physically or chemically modified to decrease its surface energy so that it will better wet the surface. This can be accomplished in a number of ways such as adding a surfactant to the monomer or modifying chemical functional groups on the monomer.

The monomers suitable for use in the present invention are the polynuclear aromatic hydrocarbons, including naphthalene, anthracene, methylnaphthalene, tetrahydronaphthalene, pyrene, pentacene, phenanthrene, with and without side chains, such as, methyl and ethyl groups. These monomers can be used singly or in combination during the same cycle in order to ultimately form a hybrid matrix material with a more ordered structure. Alternatively, they can be impregnated during different cycles to form a layered structure for additional fracture toughness. With this technique one can also tailor the molecular weight and make the molecular weight extraordinarily high, if this is desired.

After the fiber/matrix combination is chosen, the next step is to choose the type of preform that is to made from the chosen fibers and then densified. These preforms include, but are not solely limited to, preforms which have been consolidated into their low-density preliminary form by a variety of processes such as wet-filament winding or prepeg layup followed by bagging, for shape retention, and pyrolysis (rigid-preforms); preforms which consist only of reinforcing fibers held together by physical constraining forces, such as clamps and/or dry filament winding and/or weaving ("binderless" preforms). The fibers in these preforms can be random in orientation, but preferably, are oriented in a multiple number of preferred directions. The unifying feature of all these composite preforms is that they are in need of additional matrix material(s) due to insufficient composite strength or unacceptably high porosity. Alternatively, these preforms might lack a consolidating matrix all together, which is known as a binderless preform.

The next step is to impregnate the preform with the wetting monomer. Unlike current processes, since the monomer wets the surface there is no need to use vacuum or pressure to force the monomer into the preform although it is possible to employ a vacuum to remove the air in the preform and speed the impregnation process. Likewise, pressure might be used to slightly enhance the rate of impregnation. However, it should be noted that, contrary to current processes in which vacuum and pressure are needed to force the non-wetting matrix material into the interior of the preform, in the present invention, pressure and vacuum are not needed to impregnate the interior of the preform. It is possible, however, they can be employed to slightly increase the rate of impregnation but the decision to employ vacuum or pressure is an economic decision and not a technical one. That is, since there is a very great increase in processing equipment cost and difficulty using a high pressure vessel, a decision would have to be made whether the additional investment is warranted to decrease processing time slightly.

In the present invention, the impregnation takes place when the preform is brought into contact with the wetting monomer. This can occur by either immersing the preform in the monomer or by contacting a portion of the preform with a quantity of monomer that is greater than that needed to fill the preform completely. Thus, for instance, the preform could be brought into contact with a reservoir of monomer on its top or bottom surface. The monomer would then be drawn into the preform by capillary action displacing the air. Thus, in this example drawing a vacuum on the preform would not increase the rate of impregnation. After, the preform has been completely filled, it is then placed in a quantity of monomer sufficient to completely cover the preform.

In the preferred embodiment, when the monomer is impregnated into the preform it is necessary that a catalyst be present in the preform along with the monomer. This can be accomplished in a number of ways. For example, the fibers in the preform could be coated with catalyst before it is impregnated with monomer. Alternatively, the catalyst could be mixed with the monomer before impregnation. However, it should be noted that the manner in which the monomer and catalyst are brought together is not crucial to this invention. It is only necessary that they both be present in the preform.

The catalysts suitable for use in the present invention are those commonly known as Lewis acids, including aluminum chloride, silicon tetrachloride, titanium chloride, zirconium chloride, ferric chloride, boron trifluoride and hydrogen is fluoride. If high purity is required, $HF/BF_3$ or $BF_3$ would be the catalyst of choice, since 100% of the catalyst can be recovered after processing, leaving only the carbon matrix. If purity is not crucial, $AlCl_3$ or $SiCl_4$ would be the catalyst of choice. These catalyst systems leave excess Al or Si in the matrix, which either come out of the composite at elevated temperature or can remain to form carbides.

Impregnation of the monomer into the preform is followed by polymerization of the monomer by a single-phase reaction mechanism into an infusible polymer. This usually is accomplished in a closed container so that gases arising from polymerization are not vented directly to the atmosphere. In contrast to other processes, although it can be, the container need not be externally pressurized. However, it should be noted that if the polymerization gases are not vented there will be a small pressure buildup in the container. This small pressure buildup can be controlled by the amount of monomer material and may be desirable although is not absolutely necessary.

After polymerization has proceeded to the desired extent, the partially-densified preform is heated to elevated temperature to convert the organic polymer to a carbon matrix material, if the polymer has become infusible. During this pyrolysis step known as carbonization, gases will again be given off and therefore a sealed container or a container with a burn-off oven should be used. If desired, this pyrolysis can be accomplished in the same container used for the impregnation and polymerization. Alternatively, a second container can be used. This second container can be a high temperature high pressure cell capable of pressures of 1 ksi or even of 10–25 ksi so that carbonization can be performed under pressure if desired. This again is a financial/schedule decision rather than a technical decision weighing the relative cost of pressure carbonization vs additional 1 day cycles.

For many applications, after these steps of impregnation-polymerization-carbonization have been performed a sufficient number of times to bring the density to the desired value, the process is complete. However, for some applications, post-processing may be desired, This can be in the form of heat-treatment such as graphitization. This post-processing can be performed after any densification cycle.

The present In Situ densification process produces a matrix that is superior to that obtained from resins, petroleum pitch, or coal tar pitch and actually has the beginnings of graphitic order after heat-treatment to only 1100° C. X-ray analysis and scanning tunneling microscopy of 1100° C. material have shown crystallites with an $L_a$ of 10 nm and an $L_c$ of 2.8 nm. This amount of order is comparable to that of graphitized matrices produced from pitch as shown by their similar ablation rates as described below. In addition, when the matrix produced by the present In Situ Densification Process is graphitized, the high quality matrix that results has the same high thermal conductivity of a matrix produced by a CVD or CVI process. Thus, the present rapid low cost liquid phase densification process produces a matrix very similar to a high quality matrix produced by a gas phase CVI process.

In conventional densification processes, after graphitization, the last step in each densification cycle is to machine the outside of the composite in order to open up access to the pore structure of the composite that has been blocked by the impregnant. However, in the present invention it should be noted that, unlike all other processes, there is no need for machining of the part after each densification cycle. This is because in the present invention the pores on the surface are not blocked by the impregnant because the impregnant is sucked uniformly throughout the part to be densified. The fact that In Situ densified parts do not need machining decreases both the cost and the densification time of the part.

It is also within the scope of this invention to modify at least the carbon matrix by conversion into an oxidation resistant material. Carbon-carbon composites have been used, for example, as a friction lining in high performance aircraft brakes and as protective heat shields on high performance aerospace vehicles. One disadvantage of this material is, however, the low oxidation resistance of the carbon, which results in high ablation in CFC components if they cannot be kept under a protective gas. Carbon-carbon composites for such applications can be converted with a technique such as, siliconization using the known techniques of powder bed or silicon wick.

The following examples illustrate the invention:

EXAMPLE 1

This example deals with the densification of a high performance 4-dimensionally woven pitch-carbon fiber preform that measured 4"×4"×6". After performing wetting studies on various carbon fiber surfaces, naphthalene was found to spread over both pitch and PAN fibers and was used as the monomer for a carbon matrix. The required amount of naphthalene along with aluminum chloride catalyst was placed in a Parr reactor and heated in the range 190–260° C. to melt the mixture. The fiber preform was then placed in the molten mixture and the reactor was sealed. The temperature was kept at 190–260° C. and the molten mixture was stirred until impregnation was complete in 4 hour. At this time the temperature of the sealed reactor was raised to 300–500° C. and kept at this temperature for 4 hours for the polymerization to occur. There was no applied external pressure. The only pressure in the reactor was that due to the polymerization products, which was variable depending on the amount of excess monomer. After polymerization was complete, the reactor was vented to the atmosphere through a burn-off oven and the sample was heated to a temperature between 700° C. and 1400° C. for the pyrolysis of the polymer to occur yielding a carbon matrix material. The char yield of the polymerized naphthalene was 92%, which is significantly higher than commercial processes.

During the first cycle, which lasted a total of 24 hours, the density of the preform was increased from 1.0 g/cc to 1.4 g/cc. When the billet was sectioned and examined, it was seen that the fiber bundles were preferentially densified and had actually become reinforced rods in the composite. It was also observed that the density throughout the entire billet was uniform in spite of the thickness. After the billet was densified with four cycles of impregnation, pyrolysis, and carbonization, which took a total of 96 hours, the density had increased to 1.81/cc. Normal commercial processing takes 6–8 months to reach this bulk density for a high-performance billet of this size.

After the billet had been densified to 1.81 g/cc, it was cut and machined into small rocket nozzles without first graphitizing the billet. These rocket nozzles were then fired in solid rocket motors. On the basis of density, the nozzle fired in the solid rocket motor performed equivalently to a 4-D baseline material that had been subjected to 6 cycles of liquid phase impregnation, carbonization, graphitization and machining which took 6 months.

EXAMPLE 2

A second high performance billet of similar dimensions made from 3-dimensionally woven PAN carbon fibers was densified with naphthalene under similar conditions. This billet was cut up and machined into rocket nozzles for liquid rocket engines. Several of these nozzles were fired for two minutes in a liquid rocket engine in which the flame temperature was 2325° C., the chamber pressure was 820 psi., and the oxygen/fuel ratio was 2.9. The recession rate was found to be 0.00049 inches/sec. This is 4 times smaller than an equivalent 3-D material that has been densified by conventional processing techniques.

It is thought that this ablation rate which is significantly lower than that of conventionally processed billets is due to the lack of continuous pore networks. That is, in conventional processing, in order to get good mechanical properties the billet is graphitized after each carbonization cycle. The heating to 2400° C. causes a crack network to form between the fiber tows and the matrix pockets. This network closes as the temperature is lowered but re-opens at elevated temperatures. Although it is thought to increase thermal shock resistance, this crack network also allows gas penetration at elevated temperatures. Thus, in a rocket nozzle application the conventionally processed billet will allow gas penetration and reaction in the pore network as the temperature is raised. In contrast, the in situ processed billet will only react on the exterior surface. The results of these tests demonstrate that carbon-carbon billets densified by In-Situ polymerization of naphthalene, which were densified in 5% of the time required by other processes and at a small fraction of the cost, performed equal to or exceeded the performance of commercial materials.

EXAMPLE 3

As stated above, this present densification process produces the high quality matrix needed for high-performance high-temperature fiber-reinforced composites. In these composites, the fibers are high-performance fibers, which are oriented in specific directions. In addition, there is a high volume fraction of the fibers (volume occupied by fibers/volume of composite) in the preform and finished composite. This high fiber-volume-fraction means that fiber bundles are closer together and thus the matrix pocket-voids (empty space surrounded by fiber bundles) in the fiber preform are smaller than those in a lower-perforrnance composite. Since the present process is based on wettability, the efficiency of densification is proportional to the preform surface area and inversely proportional to void size. Thus, a high-performance preform with a smaller fiber unit cell and thus smaller voids to fill will densify more efficiently than a low performance preform with less fibers/unit volume.

This example deals with the densification of a low-performance preform with a low fiber-volume-fraction (35–40% for a multidirectional perform) and relatively large matrix pocket-voids. In this preform the ratio of the surface area of the fibers surrounding the matrix pocket void to the volume of the matrix pocket void is relatively small. Since this ratio is small and the present process is surface dominated, it will take many cycles to densify a preform with a low fiber-volume-fraction.

To density this preform more efficiently in a fewer number of cycles, it is desirable to use a particulate or fiber filler along with the wetting monomer to efficiently fill the relative large matrix pocket-voids. This is accomplished by placing the filler in the preform before impregnation or by entraining the filler in the wetting monomer during impregnation. The choice of filler depends on the type of matrix material desired and its intended use. However, it should be noted that it is imperative that the filler be wet by the monomer. For carbon matrix composites the filler will consist of micron-sized particles or chopped fibers that may possess either a non-graphitic carbon or preferably graphitic structure such as graphitized carbon black or catalytic graphite fibers. (If graphitic material does not wet, it can be surface treated.) Alternatively, fibers or particulates that inhibit the oxidation of carbon or graphite can be employed.

The filler decreases the void space but unlike other processes, the filler does not block impregnation thereby causing a decrease in ultimate density but actually enhances it if it is wet by the monomer. That is, in other processes in which the matrix precursor does not wet the preform surface, fillers impede impregnation because they make the average void size smaller. Thus, with fillers it not only takes more pressure to force the non-wetting precursor into the preform voids but the matrix precursor can not fill the smaller voids and thus the efficiency of impregnation is also decreased. In contrast, with the present surface-tension-dominated wetting process, the filler, because it increases surface area and decreases average void size, enhances the efficiency of the densification process. However, it should be noted that in all densification processes, unless the filler is placed in the preform during preform manufacture, it will preferentially reside near the surface of the perform because it will be filtered by the perform as well as by filler initially deposited in the surface of the perform. This is a well-documented effect known as self-filtration. This will increase the perform density near the surface and cause a density gradient through the preform with the gradient being accentuated for thicker composites. For non-wetting impregnants this will exacerbate the problem that already exists because the filler will increase the density near the surface, close off porosity, and further impede the entrance of pre-matrix material to the interior of the preform. In contrast, for wetting impregnants it only has the potential for causing a density gradient if the filler is not placed in the perform properly.

In this example, catalytic graphite fibers were used in the densification of a low density carbon fiber preform with a bulk density of 0.4 g/cc. These fibers, which were made by a gas phase process using metal catalyst particles and possess a diameter of 2 microns, were ground up so that their lengths were of micron dimensions. The fibers, which are wetted by naphthalene, were mixed with the naphthalene wetting monomer and aluminum chloride catalyst and then entrained in the liquid as it soaked into the preform under capillary forces. The conditions of impregnation, polymerization, and pyrolysis were the same as in previous examples. The filler loading of the monomer increased the uptake on each cycle by 20%.

EXAMPLE 4

As in the previous example a low-density low-performance sample was densified using the techniques of this present invention in order to demonstrate that this process can also be used to density a low performance preform. In this example the samples was a needled felt that had a dry density of 0.4–0.5 g/cc. After only one densification cycle, the density increased to >1.0 g/cc with an effective weight gain of up to 150%. After only 4 cycles, which took only 5 days of processing, the true density had increased to 1.8 g/cc. With a high-performance high fiber-volume-fraction preform, pressure has little effect during impregnation in the present process because capillary action of the wetting monomer pulls matrix monomer into the preform and holds it there. However, for a low fiber-volume-fraction preform in which the voids are relatively large, pressure can be an aid in keeping monomer in the center of the voids. Thus, it was found that pressurization with 500 psi argon during impregnation in the first cycle increased the weight gain by 35%. Pressurization with 500 psi Argon during polymerization had a negligible effect on char yield. When the preform voids are significantly filled leaving only small voids, pressure again has little effect.

EXAMPLE 5

One of the distinctive features of the In Situ Densification Process is that the impregnant coats the surface of the perform and partially densified perform on each densification cycle. Thus, the process does not fill certain voids and close off porosity as had been stated for other processes. Looking at the situation in another way, the In Situ Densification Process, unlike other processes, leaves a continuous open porous network after each densification cycle. This continuous pore network is available to the carbon matrix precursor on the subsequent densification cycle. In addition, this pore network offers a superior pathway for the conversion of the matrix and in some cases, if desired, the fibers as well. Another benefit of the In-Situ Densification process, in relation to conversion processes, is that the fibers of the preform are coated with impregnant, leaving a carbon layer on the surface of the fibers. This layer prevents attack of the fibers during the conversion process.

One conversion process that has been demonstrated is the siliconization of a partially densified preform, typically through melt infiltration of silicon via powder bed or silicon wick. Carbon preforms, (24" long×12" wide×1" thick), were partially densified with the in-situ process to a density of 1.3 g/cc. These preforms were heat treated to temperatures above 1200° C. to drive off any residual gas in the composite. The parts were siliconized using the above mentioned siliconization processes, without damage to the fiber. Of course, conversion with other materials, such as, hafnium and zirconium will produce a composite with a converted matrix capable of higher temperature application.

EXAMPLE 6

Several different catalysts have been demonstrated in the In-Situ Densification process with similar results. All of these catalysts fall in to the classification of a Lewis Acids (electron donors). Depending on the final requirements of the composite, different catalysts can be used. If high purity is required, HF/BF3 or BF3 could be the catalyst of choice, since 100% of the catalyst is recovered after processing, leaving only the carbon matrix. If purity is not crucial, $AlCl_3$ or $SiCl_4$ could be the catalyst of choice. These catalyst systems leave excess Al or Si in the matrix, which either come out of the composite at elevated temperature or can remain to form carbides, which are beneficial for oxidation protection.

Various carbon fiber preforms (needled felts, 2D) were impregnated with naphthalene and catalyst through 5 impregnation cycles. Due to the fact that the $SiCl_4$ is a weaker Lewis Acid, additional catalyst needed to be added (10–40 weight %). Separate trials were done with the $AlCl_3$ catalyst in the 1–25 weight % range. Weight gains after each cycle were nearly identical between the two catalyst systems and the final density for both types of material was approximately 1.7 g/cc.

Due to the fact that the HF/BF3 is a very complicated catalyst system to work with and requires special equipment, trials have not been conducted. However, a review of the literature has shown that this system works in much the same way as the $AlCl_3$ catalyst system.

EXAMPLE 7

Another variation of the in-situ process is to fabricate a lower performance composite in a rapid and low cost fashion. Several examples of this would include impregnation of a preform with an epoxy or phenolic resin to fill up the larger pores (>100 um) in the preform. Upon carbonization to temperatures>700° C., the resin chars, leaving a carbonaceous residue in the voids. These carbonaceous chars are not high performance matrices, since they are not graphitizable. The In Situ process is then utilized to fill the smaller porosity and achieve final density. Final density is typically obtained in 1 or 2 cycles, further reducing processing times.

In this example, a random 2D composite was impregnated with phenolic resin and carbonized to ~1000° C. The density of the part after carbonization was about 1.45 g/cc. Two in-situ densification cycles were performed on this part, with the final density being 1.83 g/cc.

Examples of other materials that have also been used as pre-In Situ impregnants include petroleum based pitches (Aerocarb series) and synthetic pitches (AR series).

Although rocket nozzles made by the present process performed exceedingly well, there are final steps in processing as well as additional steps in post-processing of the densified billet that can be taken to improve the performance of nozzles made by the present process. In some applications involving high-temperature erosive environments, such as rocket motors or nose-cones, it may be not be advantageous to follow the final impregnation with monomer and subsequent In-Situ Polymerization with the usual final pyrolysis step. Instead, this final pyrolysis step can be left to take place during actual use, and thereby enhance performance due to both the heat absorption required to pyrolysis the final batch of In-Situ Polymerized matrix-precursor and/or outgassing, (of the small amount of polymer lost as gas during high-efficiency pyrolysis). This is normally referred to as "ablative protection". The monomer employed in this final truncated densification step can, of course, be different than monomer employed in earlier steps. This might be done, for example, if the beneficial effects of outgassing were to be increased. Employing a monomer for the final densification which produces polymer with a low pyrolysis efficiency would achieve this goal. Also, molecular weight of the final In-Situ Polymerized matrix-precursor could be deliberately left low to increase the ablative effect.

It should be noted at this point that additional fabrication processes can be carried out on the In-Situ Polymerized preforms at any time during a given In-Situ Densification cycle; i.e., either before, concurrent with, or after pyrolysis. Examples of such additional fabrication processes are sintering, graphitization, and exposure to high-energy electron, magnetic, or particle beams. These processes would have the effect of modifying physical and/or chemical properties of the composite's matrix, fibers, fiber-matrix interface, or surface. Graphitization, for example, can affect a structural change in any or all of these carbon-carbon composite areas depending on the actual conditions employed.

Clearly many modifications and variations of the present invention are possible in light of the above teachings and it is therefore understood, that within the inventive scope of the inventive concept, that the invention may be practiced otherwise than specifically claimed.

We claim:

1. A process for manufacturing a high-temperature fiber-reinforced carbon-carbon composite material of essentially uniform density, which comprises the steps of:
   (a) selecting a fiber/matrix material combination;
   (b) providing a fiber preform of desired shape and fiber placement;
   (c) selecting at least one monomer from the group consisting of naphthalene, anthracene, methylnaphthalene, ethylnaphthalene, tetrahydronaphthalene, pyrene, pentacene, phenanthrene, methylphenanthrene, and ethylphenanthrene;
   (d) impregnating said fiber preform with said monomer;
   (e) polymerizing said monomer material in-situ in a single phase process into a pre-carbon polymer of desired molecular weight;
   (f) pyrolyzing said pre-carbon polymer to form a carbon matrix material; and
   (g) repeating steps (d)–(f) to further density said preform.

2. The process of claim 1 further including the step of evacuating said fiber preform prior to impregnation in order to enhance the rate of impregnation.

3. The process of claim 1 further including the use of pressure during impregnation in order to enhance the rate of impregnation.

4. The process of claim 1 further including the use of pressure during polymerization to increase the char yield or to enhance polymerization.

5. The process of claim 1 wherein a polymerization catalyst is employed in said polymerization step (e).

6. The process of claim 5 wherein said polymerization catalyst is mixed with said monomer prior to said impregnation step.

7. The process of claim 5 wherein the fibers in said preform are coated with a polymerization catalyst prior to said impregnation step.

8. The process of claim 5 wherein said polymerization catalyst is a Lewis acid.

9. The process of claim 1 further including the step of mixing microscopic filler material with said monomer prior to impregnation.

10. The process of claim 1 wherein the surface of said fibers in said preform are treated to increase wettability by said monomer by a fiber surface treatment selected from the group consisting of sizing removal, chemical treatment, physical treatment, and plasma processes.

11. The process of claim 8 wherein said monomer is anthracene.

12. The process of claim 11 wherein said catalyst is aluminum chloride.

13. The process of claim 8 wherein said monomer is methyinaphthalene.

14. The process of claim 13 wherein said catalyst is aluminum chloride.

15. The process of claim 8 wherein said monomer is ethyinaphthalene.

16. The process of claim 15 wherein said catalyst is aluminum chloride.

17. The process of claim 8 wherein said monomer is tetrahydronaphthalene.

18. The process of claim 17 wherein said catalyst is aluminum chloride.

19. The process of claim 8 wherein said monomer is pyrene.

20. The process of claim 19 wherein said catalyst is aluminum chloride.

21. The process of claim 8 wherein said monomer is pentacene.

22. The process of claim 21 wherein said catalyst is aluminum chloride.

23. The process of claim 8 wherein said monomer is phenanthrene.

24. The process of claim 23 wherein said catalyst is aluminum chloride.

25. The process of claim 8 wherein said monomer is methylphenanthrene.

26. The process of claim 25 wherein said catalyst is aluminum chloride.

27. The process of claim 8 wherein said monomer is ethylphenanthrene.

28. The process of claim 27 wherein said catalyst is aluminum chloride.

29. The process of claim 1 further comprising the step of modifying the resulting carbon-carbon composite material with an oxidation-inhibiting protective coating.

30. The process of claim 29 wherein said protective coating is silicon.

31. A high-temperature fiber-reinforced carbon-carbon composite material of essentially uniform density, fabricated by the steps of:
   (a) selecting a fiber/matrix material combination;
   (b) providing a fiber preform of desired shape and fiber placement;
   (c) selecting at least one monomer from the group consisting of naphthalene, anthracene, methylnaphthalene, ethylnaphthalene, tetrahydronaphthalene, pyrene, pentacene, phenanthrene, methylphenanthrene, and ethylphenanthrene;
   (d) impregnating said fiber preform with said monomer;
   (e) polymerizing said monomer material in-situ in a single phase process into a pre-carbon polymer of desired molecular weight;
   (f) pyrolyzing said pre-carbon polymer to form a carbon matrix material; and
   (g) repeating steps (d)–(f) to further density said preform.

32. The product of claim 31 wherein a microscopic filler material is mixed with said monomer prior to impregnation.

33. The product of claim 31 wherein said monomer is anthracene.

34. The product of claim 31 wherein said monomer is methylnaphthalene.

35. The product of claim 31 wherein said monomer is ethylnaphthalene.

36. The product of claim 31 wherein said monomer is tetrahydronaphthalene.

37. The product of claim 31 wherein said monomer is pyrene.

38. The product of claim 31 wherein said monomer is pentacene.

39. The product of claim 31 wherein said monomer is phenanthrene.

40. The product of claim 31 wherein said monomer is methylphenanthrene.

41. The product of claim 31 wherein said monomer is ethylphenanthrene.

42. A high-temperature fiber-reinforced carbon-carbon composite material of essentially uniform density, fabricated by the steps of:
   (a) selecting a fiber/matrix material combination;
   (b) providing a fiber preform of desired shape and fiber placement;
   (c) selecting at least one monomer from the group consisting of naphthalene, anthracene, methylnaphthalene, ethyinaphthalene, tetrahydronaphthalene, pyrene, pentacene, phenanthrene, methylphenanthrene, and ethylphenanthrene;
   (d) impregnating said fiber preform with said monomer;
   (e) polymerizing said monomer material in-situ in a single phase process into a pre-carbon polymer of desired molecular weight;
   (f) pyrolyzing said pre-carbon polymer to form a carbon matrix material;
   (g) repeating steps (d)–(f) to further density said preform; and
   (h) modifying the resulting carbon-carbon composite material with an oxidation-inhibiting protective coating.

43. The product of claim 42 wherein a microscopic filler material is mixed with said monomer prior to impregnation.

44. The product of claim 42 wherein said protective coating is silicon.

45. The product of claim 42 wherein said monomer is naphthalene.

46. The product of claim 42 wherein said monomer is anthracene.

47. The product of claim 42 wherein said monomer is methyinaphthalene.

48. The product of claim 42 wherein said monomer is ethylnaphthalene.

49. The product of claim 42 wherein said monomer is tetrahydronaphthalene.

50. The product of claim 42 wherein said monomer is pyrene.

51. The product of claim 42 wherein said monomer is pentacene.

52. The product of claim 42 wherein said monomer is phenanthrene.

53. The product of claim 42 wherein said monomer is methylphenanthrene.

54. The product of claim 42 wherein said monomer is ethylphenanthrene.

* * * * *